(12) United States Patent
Yoon et al.

(10) Patent No.: US 11,941,876 B2
(45) Date of Patent: Mar. 26, 2024

(54) DOOR STATUS VERIFICATION USING A CAMERA AND ARTIFICIAL INTELLIGENCE

(71) Applicant: Haier US Appliance Solutions, Inc., Wilmington, DE (US)

(72) Inventors: Je Kwon Yoon, Seongnam (KR); Seung-Yeong Park, Seongnam (KR); Hyoyeol Maeng, Bucheon-si (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 267 days.

(21) Appl. No.: 17/326,728

(22) Filed: May 21, 2021

(65) Prior Publication Data
US 2022/0374624 A1 Nov. 24, 2022

(51) Int. Cl.
*G06V 10/82* (2022.01)
*G06F 18/2413* (2023.01)
(Continued)

(52) U.S. Cl.
CPC .......... *G06V 20/13* (2022.01); *G06F 18/2413* (2023.01); *G06N 3/08* (2013.01);
(Continued)

(58) Field of Classification Search
CPC .......... G06N 3/08; G06N 3/04; G06N 3/0464; G06N 3/084; D06F 2103/00; D06F 2103/64; D06F 2105/58; D06F 34/05; D06F 33/43; D06F 34/20; D06F 39/14; D06F 2103/26; D06F 2105/54; D06F 33/47; D06F 34/16; D06F 34/18; D06F 34/28; D06F 37/266; D06F 2103/02; D06F 2103/06; D06F 2105/00; D06F 2105/48; D06F 2105/52; D06F 23/02; D06F 25/00; D06F 33/32; D06F 34/08; D06F 34/14; D06F 37/02; G06V 10/764; G06V 10/82; G06V 20/20; G06V 20/52; G06V 40/20; G06V 10/255; G06V 10/751; G06V 20/00;
(Continued)

(56) References Cited

U.S. PATENT DOCUMENTS 9,860,491 B2 * 1/2018 Park .................. H04N 7/183
10,228,187 B2 3/2019 Hong
(Continued)

FOREIGN PATENT DOCUMENTS

CN 109684976 A 4/2019
CN 109872369 A 6/2019
(Continued)

*Primary Examiner* — Ian L Lemieux
(74) *Attorney, Agent, or Firm* — Dority & Manning, P.A.

(57) ABSTRACT

An appliance includes a camera for calibrating and determining whether the door of the appliance is in a closed position. A controller is operably coupled to the camera. The controller is configured for obtaining one or more images of the appliance chamber or door. An artificial intelligence image recognition process is used to perform image classification and establish a baseline image to determine whether subsequent closing of the appliance door is successful. In the event of a failure to obtain the baseline image or a determination that the door is not closed, operation of the appliance may be disabled.

18 Claims, 3 Drawing Sheets

(51) Int. Cl.
*G06N 3/08* (2023.01)
*G06V 10/20* (2022.01)
*G06V 10/75* (2022.01)
*G06V 20/10* (2022.01)
*G06V 20/13* (2022.01)

(52) U.S. Cl.
CPC .......... *G06V 10/255* (2022.01); *G06V 10/751* (2022.01); *G06V 10/82* (2022.01); *G06V 20/10* (2022.01)

(58) Field of Classification Search
CPC ...... H04N 23/633; H04N 7/188; F25D 11/00; F25D 2201/10; F25D 23/00; F25D 23/02; F25D 23/028; F25D 23/04; F25D 23/062; F25D 23/067; F25D 23/12; F25D 2300/00; F25D 2323/021; F25D 2400/02; F25D 2400/361; F25D 25/025; F25D 2500/06; F25D 2600/00; F25D 27/00; F25D 2700/02; F25D 2700/06; F25D 29/00; F25D 29/005; G06T 2207/20224; G06T 2207/30204; G06T 7/001; G06T 7/11; G06T 7/20; G06T 7/246; G06T 7/254; G06T 7/33; G06T 7/60; G06T 7/62; G06T 7/73; G06T 7/90; G06T 7/0002; A47L 15/0049; A47L 15/0063; A47L 15/4257; A47L 2401/30; A47L 2501/22; A47L 2501/26

See application file for complete search history.

(56) References Cited

U.S. PATENT DOCUMENTS

| | | | |
|---|---|---|---|
| 11,521,391 B2 * | 12/2022 | Kim | G06Q 30/0641 |
| 11,539,546 B2 * | 12/2022 | Park | H04L 12/2812 |
| 2018/0324908 A1 * | 11/2018 | Denker | H04N 7/188 |
| 2019/0382941 A1 * | 12/2019 | Hwang | G06N 20/00 |
| 2020/0242471 A1 * | 7/2020 | Busch | G06N 3/08 |
| 2021/0093153 A1 * | 4/2021 | Boyer | A47L 15/0063 |
| 2021/0131011 A1 * | 5/2021 | Park | D06F 34/20 |
| 2021/0285653 A1 * | 9/2021 | Bhogal | G06V 10/993 |
| 2021/0334641 A1 * | 10/2021 | Kim | D06F 34/05 |
| 2022/0296073 A1 * | 9/2022 | Durham | A47L 15/0049 |
| 2022/0349102 A1 * | 11/2022 | Yun | D06F 33/47 |
| 2023/0124027 A1 * | 4/2023 | Mashal | G06V 10/82 |
| | | | 348/143 |

FOREIGN PATENT DOCUMENTS

| | | | |
|---|---|---|---|
| KR | 20150127560 A | * 10/2015 | |
| KR | 20190098935 A | 8/2019 | |
| WO | WO-2014171119 A1 | * 10/2014 | ............ F25D 29/00 |

* cited by examiner

ડોર STATUS VERIFICATION USING A
CAMERA AND ARTIFICIAL INTELLIGENCE

FIELD OF THE INVENTION

The present subject matter relates generally to appliances having a door, or more specifically, to systems for using a camera and artificial intelligence to calibrate verification of door closure and control operation of the appliance based on whether the door is fully closed.

BACKGROUND OF THE INVENTION

Appliances generally include a cabinet with a chamber therein to permit washing, drying, cooking, and so forth. The appliances generally include a door that rotates open and closed to allow access to the chamber. Depending on the appliance, the failure to fully close the door prior to operation of the appliance could lead to safety concerns, for example, allowing a user to access the chamber when motion or heat is present. In other circumstances, the failure to fully close the door may result in leakage of water, air, or heat, reducing the effectiveness of the appliance and potentially damaging property or structures near the appliance.

Conventional sensors used to determine whether an appliance door is closed lack precision and, as a result, may indicate that a door is closed when it is only partially closed or not closed at all. For example, one conventional technique utilizes the side of an appliance door to depress a plunger when the door is rotated into a closed position. In certain circumstances, the door sensor may become stuck, for example, due to the buildup of dust, dirt, lint, or the link. Some conventional applications, recognizing this problem, will require several cycles of a failure of the sensor to release to the open position before identifying a fault, thus allowing cycles in which the door could be fully or partially open. In other applications, the plunger may be depressed by the leading edge of the door, thus indicating a door closure but allowing the door to remain partially open.

Accordingly, an appliance including a more precise and consistent means of detecting door closure is desirable. More specifically, a system employing a camera and artificial intelligence to calibrate and verify door closure is desirable.

BRIEF DESCRIPTION OF THE INVENTION

Advantages of the invention will be set forth in part in the following description, or may be apparent from the description, or may be learned through practice of the invention.

In one exemplary embodiment, an appliance is provided, including a cabinet, a chamber within the cabinet defining a front opening, a door rotatably attached to the cabinet, a camera, and a controller operably coupled to the camera. The door rotates between an open position and a closed position for providing selective access to the chamber and covers the front opening when in the closed position. The controller may be configured to obtain one or more images using the camera, perform image classification of at least a portion of the one or more images using a machine learning image recognition process, determine whether the image classification provides an indication that the door is in the open position, and adjust at least one operating parameter of the appliance if image classification provides an indication that the door is in the open position.

In another exemplary embodiment, a method of calibrating an appliance is provided. The appliance includes a cabinet, a chamber within the cabinet wherein the chamber defines a front opening, a door rotatably attached to the cabinet between an open position and a closed position for providing selective access to the chamber, wherein the door covers the front opening when in the closed position, and a camera. The method includes obtaining one or more images using the camera, performing image classification of at least a portion of the one or more images using a machine learning image recognition process, determining whether the image classification provides an indication that the door is in the open position, and adjusting at least one operating parameter of the appliance if image classification provides an indication that the door is in the open position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
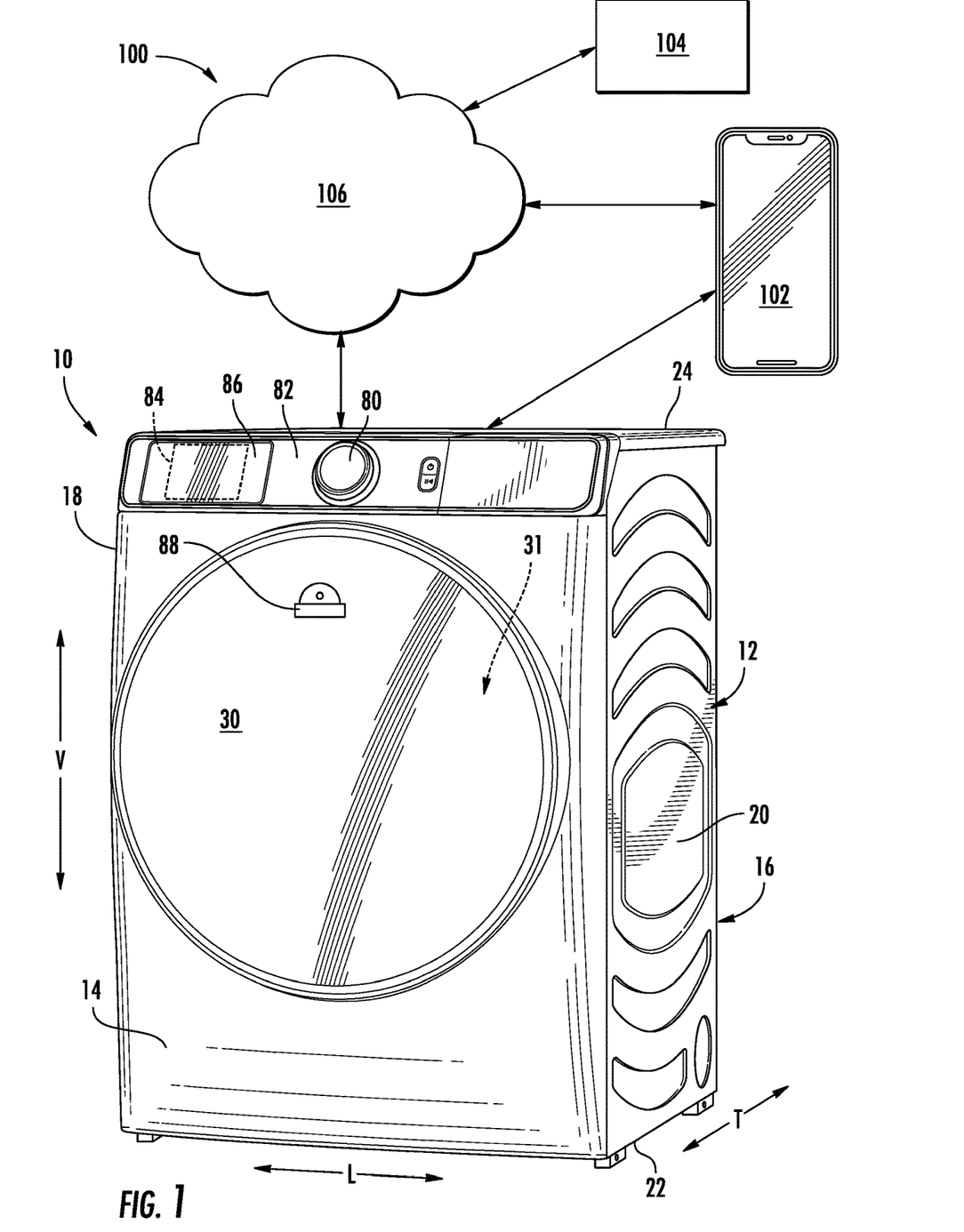
FIG. 1 provides a perspective view of an appliance according to an exemplary embodiment of the present disclosure.
Figure 2:
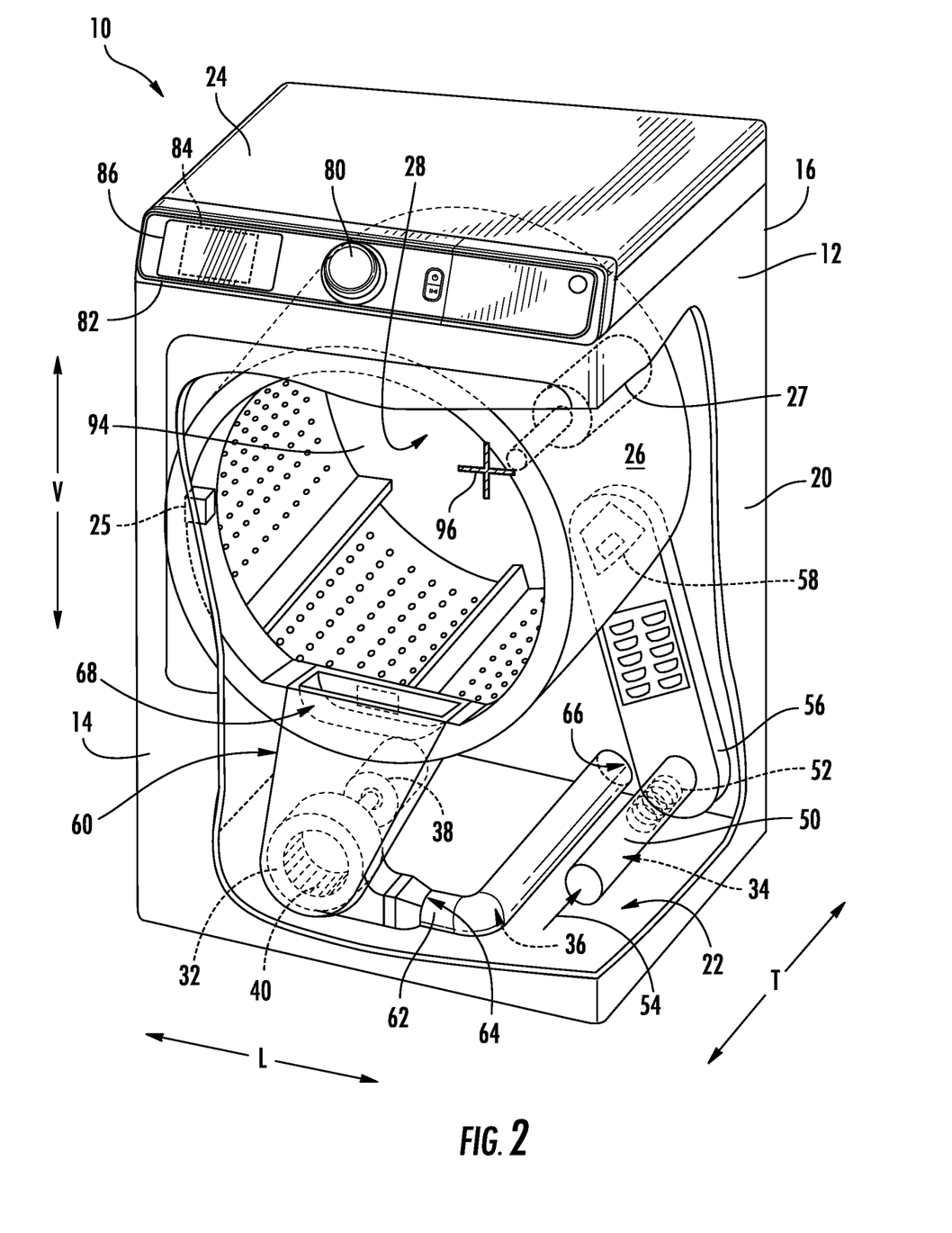
FIG. 2 provides a perspective view of the exemplary appliance of FIG. 1 with portions of a cabinet of the exemplary appliance removed to reveal certain components of the exemplary appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other appliances, including front or top-loaded washer appliances, combination washer/dryer appliances, ovens, dishwashers, refrigerators, and microwave ovens may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14 and a rear panel 16 spaced apart along the transverse direction T, a first side panel 18 and a second side panel 20 spaced apart along the lateral direction L, and a bottom panel 22 and a top cover 24 spaced apart along the vertical direction V. Within cabinet 12 is a container or drum 26 which defines a chamber 28. Chamber 28 defines a front opening 29 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. Rotation of drum 26 is driven by drum motor 27. A door 30 is rotatably mounted to cabinet 12 for providing selective access to drum 26. Door 30 rotates between an open position and a closed position. When in the closed position, door 30 covers front opening 29.

As best shown in FIG. 2, an air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

One or more selector inputs 80, such as knobs, buttons, touchscreen interfaces, etc., may be provided on a front control panel 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on front control panel 82. Display 86 may be in communication with controller 84 and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In addition, referring again to FIG. 1, dryer appliance 10 may generally include an external communication system 100 which is configured for enabling the user to interact with dryer appliance 10 using a remote device 102. Specifically, according to an exemplary embodiment, external communication system 100 is configured for enabling communication between a user, an appliance, and a remote server 104. According to exemplary embodiments, dryer appliance 10 may communicate with a remote device 102 either directly (e.g., through a local area network (LAN), Wi-Fi, Bluetooth, etc.) or indirectly (e.g., via a network 106), as well as with a remote server, e.g., to receive notifications, provide confirmations, input operational data, transmit sound signals and sound signatures, etc.

In general, remote device 102 may be any suitable device for providing and/or receiving communications or commands from a user. In this regard, remote device 102 may include, for example, a personal phone, a tablet, a laptop computer, or another mobile device. In addition, or alternatively, communication between the appliance and the user may be achieved directly through an appliance control panel (e.g., control panel 160). In general, network 106 can be any type of communication network. For example, network 106 can include one or more of a wireless network, a wired network, a personal area network, a local area network, a wide area network, the internet, a cellular network, etc. In general, communication with network may use any of a variety of communication protocols (e.g., TCP/IP, HTTP, SMTP, FTP), encodings or formats (e.g. HTML, XML), and/or protection schemes (e.g., VPN, secure HTTP, SSL).

External communication system 100 is described herein according to an exemplary embodiment of the present subject matter. However, it should be appreciated that the exemplary functions and configurations of external communication system 100 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10 and/or one or more airflow sensors which are generally operable to detect the velocity of air (e.g., as an air flow rate in meters per second, or as a volumetric velocity in cubic meters per second) as it flows through the appliance 10. In some embodiments, controller 84 is configured to vary operation profiles of heating assembly 50 based on one or more temperatures detected by the temperature sensors or air flow measurements from the airflow sensors.

Referring now specifically to FIGS. 1 and 2, dryer appliance 10 may further include a camera 88 that is generally positioned and configured for obtaining images of at least a portion of chamber 28 of dryer appliance 10. Specifically, according to the illustrated embodiment, door 30 of dryer appliance 10 comprises a window 31. According to the illustrated exemplary embodiment, a camera 88 is mounted to window 31. Specifically, camera 88 may be mounted such that is faces toward chamber 28. In this manner, camera 88 can take images or video of chamber 28. Camera 88 may be mounted to an upper portion of window 31 to minimize risk of interference from laundry articles within chamber 28. In other embodiments, camera 88 may be positioned at a central location on window 31 depending on the configuration of the dryer appliance. By mounting camera 88 to a fixed location on window 31, its field of view remains the same when door 30 is in the closed position and any image obtained by camera 88 provides the same view of chamber 28. As door 30 is opened, camera 88 moves with it, creating a different field of view for camera 88. To the extent that door 30 is not fully closed, images obtained by camera 88 will provide an offset view of chamber 28, or no view at all depending on the degree to which door 30 is open. To determine if door 30 is fully closed, camera 88 may obtain an image which may be compared to one or more reference images obtained during a calibration cycle, as further described below.

Although camera 88 is mounted to window 31 in the preferred embodiment, this arrangement is not required to practice the invention. Indeed, camera 88 may be mounted at any position on door 30 which provides a view of at least a portion of chamber 28. Additionally or alternatively, camera 88 may be mounted at any fixed location with a field of view that includes at least a portion of door 30. For example, in another embodiment, camera 88 may be mounted within chamber 28, on a fixed chamber wall 94, with a field of view that includes at least a portion of door 30. As previously described, one or more reference images of door 30 in the closed position may be stored during a calibration process and subsequent images of door 30 may be compared to the one or more reference images, as further detailed herein, to determine if door 30 is fully closed.

In some embodiments, it may be desirable to add an artificial indicator 96 as a visually distinguishing feature to aid the comparison of images with the reference image. As shown in the embodiment of FIG. 2, artificial indicator 96 comprises a shaded cross pattern on fixed chamber wall 94 within chamber 28. However, neither this location nor this pattern is necessary to practice the claimed invention. In embodiments for which camera 88 is mounted to door 30 or window 31, artificial indicator 96 may be located at any fixed position in chamber 28 within the field of view of camera 88. In other embodiment for which camera 88 is disposed within chamber 28, artificial indicator 96 may be located on an interior of door 30 and within the field of view of camera 88. In such embodiments, it is preferred that artificial indicator 96 is located on a portion of door 30 furthest from its point of rotation to maximize the displacement of artificial indicator 96 as door 30 is opened and closed, though such location is not a requirement of the invention.

Further, artificial indicator 96 need not take any particular form. In some embodiments, artificial indicator 96 may be a particular pattern or shape. In other embodiments, it may be a different color or brightness than its surroundings. In yet other embodiments, artificial indicator 96 may take the form of letters, numbers, words, or other recognizable symbols.

Those of ordinary skill in the art will recognize that alternative suitable camera locations are also available, for example, in the use of invention with other appliances than the dryer appliance 10 shown and described as the preferred embodiment here. For example, in alternative embodiments involving laundry appliances, such as front-loading washers, camera 88 may be mounted to a top portion of a gasket between the door and cabinet. Alternatively, in use of the invention in a French door style refrigerator, camera 88 may be mounted on a first door with a field of view that includes a second door when both doors are in the closed position. In such an embodiment, opening either door will affect the image taken by camera 88. Only when both doors are fully closed can an image taken by camera 88 match the one more calibrated reference images, ensuring that both doors are closed. The skilled artisan will recognize that alternative arrangements of camera 88 fall within the scope of the invention depending on the architecture of the appliance used.

It should be appreciated that camera 88 may include any suitable number, type, size, and configuration of camera 88 for obtaining images of drum 26. Although an exemplary camera 88 is illustrated and described herein, it should be appreciated that according to alternative embodiments, dryer appliance 10 may include any other camera or system of imaging devices for obtaining images of drum 26. One of ordinary skill in the art will recognize that, in other embodiments, two or more cameras could alternatively be employed to capture images of drum 26 for comparison with other images or with each other, as discussed below, and that such an embodiment would be within the scope of the invention.

Referring still to FIG. 2, dryer appliance 10 may further include a light 25 that is positioned within cabinet 12 or chamber 28 for selectively illuminating chamber 28 and an interior side of door 30 positioned therein. In certain embodiments, the appliance may employ any light source already present for illuminating chamber 28 and door 30 or may add a light source specifically for this purpose. In other embodiments, light 25 may be a part of camera 88, such as a conventional flash feature.

Notably, controller 84 of dryer appliance 10 (or any other suitable dedicated controller) may be communicatively coupled to camera 88, light 25, and other components of dryer appliance 10. As explained in more detail below, controller 84 may be programmed or configured for analyzing the images obtained by camera 88, e.g., in order to determine the operational characteristics of drum 26, and by extension, characteristics of drum motor 27, and may use this information to make informed decisions regarding the operation of dryer appliance 10.

While described in the context of a specific embodiment of dryer appliance 10, using the teachings disclosed herein it will be understood that dryer appliance 10 is provided by way of example only. Other appliances having different configurations, different appearances, and/or different features may also be utilized with the present subject matter as well. For example, the present subject matter may be employed in vented dryer appliances utilizing gas or electric heaters or heat pump-based dryer appliances that circulate air in a closed loop. Other exemplary laundry appliances may include, for example, front- or top-loading washer appliances, combination washer/dryer appliances, ovens, refrigerators, dishwashers, microwaves, or any other suitable appliance having a door.

Now that the construction of dryer appliance 10 and the configuration of controller 84 according to exemplary embodiments have been presented, an exemplary method 200 of calibrating and operating a dryer appliance will be described. Although the discussion below refers to the exemplary method 200 of operating dryer appliance 10, one skilled in the art will appreciate that the exemplary method 200 is applicable to the operation of a variety of other laundry appliances. In exemplary embodiments, the various method steps as disclosed herein may be performed by controller 84 or a separate, dedicated controller.

Figure 3:
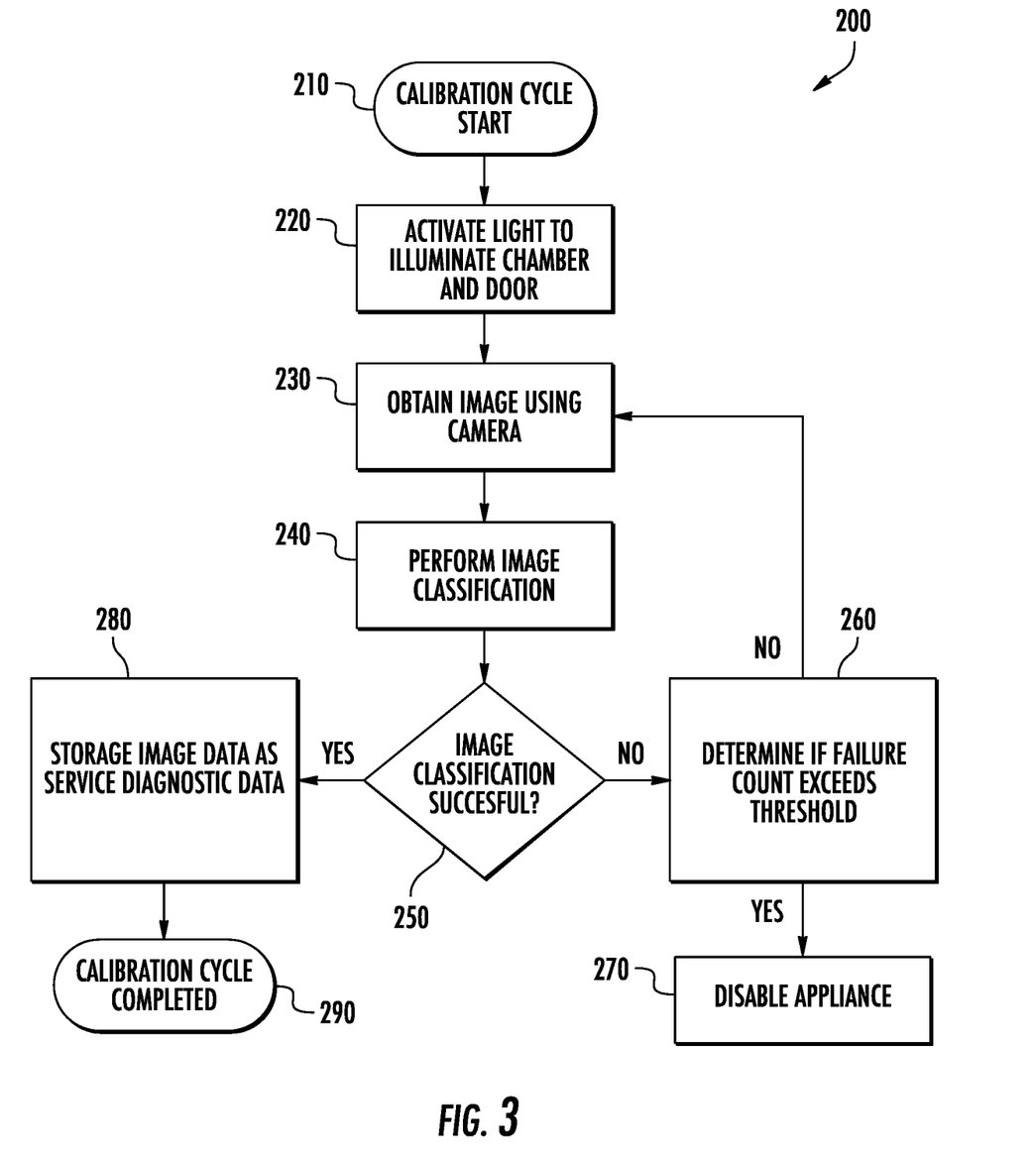
FIG. 3 provides a flow chart of exemplary controller logic for calibrating the door closure verification of the appliance using images from a camera to establish a reference service diagnostic data for subsequent door closure verification.

Referring generally to FIG. 3, a method of calibrating and operating an appliance, such as a dryer appliance, is provided. According to exemplary embodiments, method 200 includes, at step 210, the appliance begins a calibration cycle. Calibration is necessary to provide one or more reference points to aid in determining whether the appliance door is fully closed during subsequent option of the appliance. Calibration is also necessary to account for tolerances inherent in the mounting position of the camera, which may vary by several millimeters. Accordingly, calibration allows the system to identify with precision the precise region or pixels of an image that a particular feature, such as an artificial indicator, will appear on that particular unit. The appliance door should be fully closed during the calibration process to provide an accurate reference.

Upon initiation of the calibration process at step 210, the controller may activate a light at step 220 to illuminate the appliance chamber and/or door. In some embodiments, use of the camera to obtain images may be accompanied by sending a signal to a light with the appliance chamber to turn on, thus providing sufficient light for the camera to operate. In other embodiments, a different lighting source, for example a flash light on the camera itself, may be employed. In yet other embodiments, activation of the light or other light source may depend on input from a light sensor within the chamber which would enable the controller to selectively determine whether sufficient light levels exist within the chamber to render lighting unnecessary, as would be understood by those skilled in the art. Additionally, or alternatively, assessment of the adequacy of the current light level within the chamber may be performed using image processing, wherein an image is taken without the light source and the resulting image is analyzed or compared to known data to assess, for example, the level of saturation in the image.

Once illuminated, the controller activates the camera at step 230 to obtain one or more images. At step 240, the controller may perform image classification of the one or more images obtained from the camera to determine whether the images obtained are satisfactory. As used herein, the terms image classification, image recognition process, object detection, segmentation, and similar terms may be used generally to refer to any suitable method of observation, analysis, image decomposition, feature extraction, etc. of one or more images or videos taken within a chamber of an appliance. In this regard, the image recognition process may use any suitable artificial intelligence ("AI") technique, for example, any suitable machine learning technique, or for example, any suitable deep learning technique. It should be appreciated that any suitable image recognition software or process may be used to analyze images taken by camera 88 and controller 84 may be programmed to perform such processes.

According to an exemplary embodiment, controller 84 may implement a form of image recognition called region based convolutional neural network ("R-CNN") image recognition. Generally speaking, R-CNN may include taking an input image and extracting region proposals that include a potential object, such as artificial indicator 96. In this regard, a "region proposal" may be regions in an image that could belong to a particular object, such as an artificial indicator having particular characteristics, such as a known shape. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 240 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments, controller 84 may implement a form of image recognition called convolutional neural network ("CNN") image recognition. Generally speaking, CNN may include taking an input image and using a convolutional neural network to identify unique signatures in the image. According to still other embodiments, the image recognition process may use any other suitable neural network process. For example, the image recognition process may include the use of temporal convolutions ("T-CNN") and other types of deep feature extraction techniques. In addition, a K-means algorithm may be used. Other image recognition processes are possible and within the scope of the present subject matter.

It should be appreciated that any other suitable image recognition process may be used while remaining within the scope of the present subject matter. For example, step 240 of method 200 may include using a deep belief network ("DBN") image recognition process. A DBN image recognition process may generally include stacking many individual unsupervised networks that use each network's hidden layer as the input for the next layer. According to still other embodiments, step 240 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

Any other suitable image classification technique may be used according to alternative embodiments. For example, various transfer techniques may be used, but use of such techniques is not required. If using transfer techniques learning, a neural network architecture may be pretrained such as VGG16/VGG19/ResNet50 with a public dataset then the last layer may be retrained with an appliance specific dataset.

In the preferred method 200, the controller is pretrained to anticipate the artificial indictor or other feature to appear in a particular region or range of pixels. At step 250, the controller determines whether the image classification performed successfully. An unsuccessful classification from the failure to identify the artificial indicator or other feature within the expected region provides an indication that the door is in the open position. Additionally, or alternatively, image classification may fail, for example, due to an unwanted particle on the camera lens.

If image classification fails at step 250 indicating that the door is open, then method 200 may adjust at least one operating parameter of the laundry appliance. For example, at step 260, the laundry appliance may store service diagnostic data to indicate the fault. Storing service diagnostic data may take the form of recording the fault in a diagnostic history, such as a cycle history or usage profile. Additionally, at step 260, the controller may search the service diagnostic data for prior indications of an image classification fault. A threshold parameter for allowably fault frequency may then be checked to determine if the number of prior image classification faults exceeds the threshold. The threshold may be as low as one in the preferred embodiment. However, depending on frequency of errors in the image classification process, it may be desirable in some cases for the fault threshold to be higher than one to ensure that faulty classification does not lead to disabling of the appliance.

If the number of prior image classification faults is below the threshold parameter, the method reverts to step 220 and an additional attempt to obtain a satisfactory image is repeated.

Alternatively, at step 270, if the number of image classification faults is above the threshold parameter, the fault will be considered a critical fault. In that case, adjust at least one operating parameter of the appliance, such as disabling the appliance, for example, by immediately ending the cycle or, in the case of a dryer appliance, disabling the heater. Additionally, an indicator on a user interface may be activated to alert users of the fault and the need for assessment or repair of the appliance.

If the controller determines that the image classification was successful and that the door is closed at step 250, then data representative of the image obtained is stored as service diagnostic data at step 280. The service diagnostic data stored at step 280 is pixel coordinate information of the artificial indicator in the preferred embodiment, but may include, for example, image region of the artificial indicator or other feature, data representing some or all of the image itself, or the image proxies, depending on the type of image classification employed. The calibration cycle is then complete as shown at step 290.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using dryer appliance 10 as an example, it should be appreciated that these methods may be applied to the operation of any suitable laundry appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
   a cabinet;
   a chamber within the cabinet wherein the chamber defines a front opening;
   a door rotatably attached to the cabinet between an open position and a closed position for providing selective access to the chamber, wherein the door covers the front opening when in the closed position;
   a camera; and
   a controller operably coupled to the camera, the controller configured to:
   obtain one of more images using the camera;

perform image classification of at least a portion of the one or more images using a machine learning image recognition process;

determine whether the image classification provides an indication that the door is in the open position; and adjust at least one operating parameter of the appliance if image classification provides an indication that the door is in the open position; and wherein the controller is further configured to store service diagnostic data if it is determined that the door is in the closed position.

2. The appliance of claim 1, wherein the camera is attached to the door for monitoring at least a portion of the chamber.

3. The appliance of claim 2, further comprising an artificial indicator positioned on a chamber surface within the field of view of the camera when the door is in the closed position, wherein obtaining one or more images using the camera includes obtaining images of the artificial indicator.

4. The appliance of claim 2, the door comprises a window permitting viewing through the door, wherein the camera is mounted on an outer surface of the window.

5. The appliance of claim 1, wherein the camera is disposed at fixed location within the chamber for monitoring at least a portion of the door.

6. The appliance of claim 5, further comprising an artificial indicator positioned on an interior surface of the door within the field of view of the camera when the door is in the closed position, wherein obtaining one or more images using the camera includes obtaining images of the artificial indicator.

7. The appliance of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

8. The appliance of claim 1, further comprising:
a light for illuminating the chamber, wherein the controller is further configured to selectively turn on the light prior to obtaining the one or more images of the chamber.

9. The appliance of claim 1, wherein the service diagnostic data is data representing at least a portion of the one or more images obtained by the camera.

10. The appliance of claim 1, where the service diagnostic data is pixel coordinates.

11. The appliance of claim 1, wherein the service diagnostic data is data representing an image region.

12. The appliance of claim 1, wherein adjusting at least one operating parameter of the appliance if image classification provides an indication that the door is in the open position includes searching service diagnostic data for prior indications of the door in the open position and disabling operation of the appliance if the number of prior indications exceeds a maximum threshold.

13. A method of calibrating an appliance, the appliance comprising a cabinet, a chamber within the cabinet wherein the chamber defines a front opening, a door rotatably attached to the cabinet between an open position and a closed position for providing selective access to the chamber, wherein the door covers the front opening when in the closed position, and a camera, the method comprising:

obtaining one or more images using the camera;

performing image classification of at least a portion of the one or more images using a machine learning image recognition process;

determining whether the image classification provides an indication that the door is in the open position; and adjusting at least one operating parameter of the appliance if image classification provides an indication that the door is in the open position; and storing service diagnostic data if the image classification provides an indication that the door is in the closed position.

14. The method of claim 13, wherein the service diagnostic data is data representing at least a portion of the one or more images obtained by the camera.

15. The method of claim 13, wherein the machine learning image recognition process comprises at least one of a convolution neural network ("CNN"), a region-based convolution neural network ("R-CNN"), a deep belief network ("DBN"), or a deep neural network ("DNN") image recognition process.

16. The method of claim 13, wherein the appliance further comprises a light and the method further comprises selectively turning on the light prior to obtaining the one or more images.

17. The method of claim 13, wherein adjusting at least one operating parameter of the appliance if image classification provides an indication that the door is in the open position includes searching service diagnostic data for prior indications of the door in the open position and disabling operation of the appliance if the number of prior indications exceeds a maximum threshold.

18. The method of claim 13, the appliance further comprising an artificial indicator positioned within the field of view of the camera when the door is in the closed position, wherein obtaining one or more images using the camera includes obtaining images of the artificial indicator.

* * * * *